United States Patent [19]

Izumi et al.

[11] 3,777,547
[45] Dec. 11, 1973

[54] TIME RATE MEASURING SYSTEM FOR CLOCKS AND WATCHES

[76] Inventors: Takashi Izumi, No. 1-1-405 Takatsuka Jyutaku, 123-3, Takatsuka Shinden, Matsudo-shi; Ryoji Arai, c/o Fuji Denshi Kohgyo Company Ltd., Dokushinryo No. 15-3 3-chome, Ohsu, Ichikawa-shi, both of Japan

[22] Filed: July 20, 1971

[21] Appl. No.: 165,422

[30] Foreign Application Priority Data
July 20, 1970 Japan.............................. 45/64205
June 5, 1971 Japan.............................. 46/39642

[52] U.S. Cl. ..................................... 73/6, 324/186
[51] Int. Cl. ............................................ G04d 7/12
[58] Field of Search ................. 73/6; 324/78 D, 186

[56] References Cited
UNITED STATES PATENTS
3,255,625   6/1966   Ellison ....................................... 73/6
3,183,706   5/1965   Ellison ....................................... 73/6

Primary Examiner—Richard C. Queisser
Assistant Examiner—Denis E. Corr
Attorney—Leonard H. King

[57] ABSTRACT

A digital time rate measuring system for clocks and watches, in which a time interval beginning from a start clock sound emanating from the time piece being measured and extending until the Nth clock sound thereafter, is compared with an accurate reference time interval. The reference time interval is in the form of a series of standard clock pulses including a reference clock pulse representing the end of said reference time interval. The direction of the time rate is determined based on whether said stop clock sound is leading or lagging said reference clock pulse, and the absolute value of the time rate is determined by counting the number of said clock pulses between said stop clock sound and said reference clock pulse. The oscillating frequency of a clock may be divided in the measuring system so as to suit the measurement.

10 Claims, 7 Drawing Figures

TIME RATE MEASURING SYSTEM FOR CLOCKS AND WATCHES

This invention relates to a digital time rate measuring system for clocks and watches.

With a conventional device for digitally measuring and indicating the time rate of a clock, a special counter has been used, such as an excess-three code counter or a reversible counter. With such a special counter, the time rate of a clock for a day is determined and indicated by measuring its time rate only for a very short time period, but the conventional devices have the following shortcoming.

In order to digitally measure the time rate of a clock, for instance, by measuring the time interval of 120 clock sounds (or time signals) and suitably converting the value thus measured, it is necessary to determine the time from the first clock sound or start clock sound to the 121st clock sound or the last clock sound of the clock to be measured. The time from the first clock sound to the 121st clock sound represents the time interval for 120 clock sounds. If the clock is of 5 clock sounds per second type, or one clock sound per 200 millisecond type, the clock should produce the 121st clock sound exactly at 24 seconds after the start clock sound, as long as the clock is correct. If the clock is fast or leading, the 121st clock sound is produced at a moment earlier than 24 seconds after the start clock sound, while if the clock is slow or lagging, the 121st clock sound is produced at a moment later than 24 seconds after the start clock sound.

Figure 1:
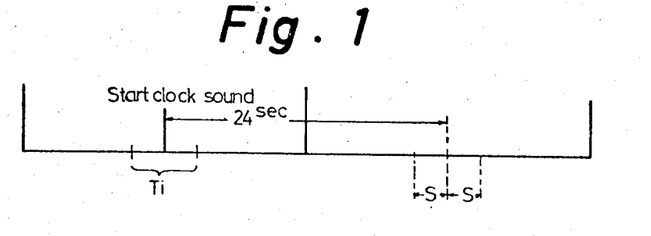
FIGS. 1 to 3 are graphs illustrating principles for digitally determining the time rate of a clock.

For a given time rate range, it is possible to select an interval S(msec), so that the 121st clock sound will reach a gate within a time interval from (24sec-Smsec) to (24sec+Smsec), as counted from the first clock sound, provided that the time rate is within the given range (FIG. 1). A gate may be used, which is open from (24sec-Smsec) until the stop clock sound reaches the gate, so as to count the number of clock pulses passing therethrough. In order to count such clock pulses, a subclock counter can be used, which is set in such a manner that it produces an output of zero when a correct clock produces its stop or 121st clock sound to the aforesaid gate S millisecond after its opening. If the frequency of the clock pulse is such that each clock pulse represents one second time rate per day, the actual time rate of a clock in terms of seconds per day can directly be determined from the counts of such clock pulses.

It should be noted that, in order to differentiate the leading time rate from the lagging time rate the subclock counter must be able to count both positive and negative numbers.

With the aforesaid method of measuring the time rate, it is sufficient to detect the start clock sound and the stop clock sound, and it is not necessary to count all of the 121 succeeding clock sounds one by one. As pointed out in the foregoing, the frequency of the clock pulse is preferably so selected as to cause each clock pulse to represent a time rate of 1 sec/day. Such frequency corresponds to 86,400 clock pulses per 24 seconds, or 3,600 c/s for clocks having five-clock sounds per second.

It is also possible to digitally determine the time rate of a clock by using a reversible counter or an excess-three code counter, as pointed in the foregoing. (FIGS. 2 and 3) In any case, the aforesaid end clock sound of a fast clock is generated between a time interval between the correct end moment (to be referred to as ±0 point) and a lead upper limit, or a maximum leading time rate, while the end clock sound of a slow clock is generated between another time interval between the ±0 point and a lag upper limit, or a maximum lagging time rate. In the case of a reversible counter, a gate circuit is used which is completed by a lead upper limit signal (representing the beginning of a measuring period) for starting the counting of the clock pulses, and the gate circuit is interrupted by the aforesaid stop clock sound for ceasing the counting of the clock pulses. For a fast or leading clock, the reversible counter starts the counting in the reverse direction in response to the application of the lead upper limit signal, and the counting is ceased upon application of the aforesaid stop clock sound. On the other hand, for a slow or lagging clock, the reversible counter similarly starts the counting, and as the contents of the counter becomes zero at the aforesaid ±0 point, the mode of the counting is switched from the reverse direction to the forward direction for continuing the forward counting until the aforesaid stop clock sound reaches the gate circuit. For a correct clock without any lead or lag, the aforesaid stop clock sound acts to interrupt the gate circuit as soon as its contents become zero for switching the counting mode from the reverse to the forward direction, so that the contents of the counter are frozen at zero because the gate circuit is interrupted by the stop clock sound. Accordingly, the judgement of the lead or lag is determined depending on whether the reversible counter is stopped in its reverse or forward counting mode, or depending on whether the contents of the reverse counter passed zero or not.

The operation of excess-three code counters will briefly be reviewed. With the excess-three code, the simultaneous reversion of all the binary "1" and all the binary "0" in the excess-three coded expression of a decimal number produces the excess-three coded expression of the complement of said decimal number with respect to nine. For instance, the excess-three coded expression for two is "1010," and the aforesaid reversion produces "0101" representing seven. When an excess-three code counter is used, its initial condition at the beginning of the counting operation is set at a code representing the complement of the aforesaid lead upper limit. A gate circuit is included in the counter, which gate circuit is closed upon application of the actual lead upper limit signal for starting the counting, and the counting is ceased when the gate circuit is opened upon application of the aforesaid stop clock sound. For a fast clock, the excess-three code counter counts the clock pulses, starting from the aforesaid initial condition at the moment of the lead upper limit signal, until the aforesaid stop clock sound is generated before the ±0 point. When the counting is ceased by the aforesaid stop clock sound, the contents of the excess-three code counter, as expressed in complements, are transmitted to the next stage as they are. On the other hand, for a slow clock, the counting of the excess-three code counter is initiated in the same manner as for the fast clock, but when the contents of the excess-three counter passes through a code corresponding to the ±0 point, (i.e., 999 in actual count or in anti-complement), its transmission is switched from the complement to the anti-complement. Furthermore, one extra clock pulse is added at the ±0 point, and then the counting operation continues until the aforesaid stop clock sound is generated. For a correct clock without any lead or lag, the counting is ceased at a code corresponding to the ±0 point, i.e., 999 in anti-complement, and an extra clock pulse is added to make the code (1)000, so as to indicate a time rate of 0 second. Thus, the judgement of fast or slow, i.e., leading or lagging, depends on whether the count is in complement or in anti-complement with an extra clock pulse added. More particularly, it depends on whether the excess-three code counter passed the ±0 point (999) or not.

Accordingly, conventional devices for digitally measuring the time rate of a clock are highly complicated.

Therefore, an object of the present invention is to provide a very simple system for digitally measuring the time rate of a clock over a wide range.

Another object of the present invention is to provide a device for digitally indicating the time rate of a clock by using a simple forward counter.

It is another object of the invention to provide a highly reliable device for digitally measuring the time rate of a clock by using integrated circuits with a high degree of integration, so as to facilitate the mass production of such devices.

Other objects and a fuller understanding of the present invention may be had by referring to the following description and claims, taken in conjunction with the accompanying drawings, in which:

In short, the principles of the system according to the present invention is to measure the time interval over $N$ clock sounds (preferably, $N$ being an even integer for eliminating the effects of uneven pulse counts) by determining the number of accurate clock pulses generated during said time interval, and to indicate the leading or lagging time rate of the clock by using a simple forward counter. With the system of the invention, it is possible to indicate the time rate of the aforesaid time interval for $N$ clock sounds relative to the correct time interval corresponding thereto, in terms of the leading or lagging time rate of the clock in so many seconds per day.

Figure 2:
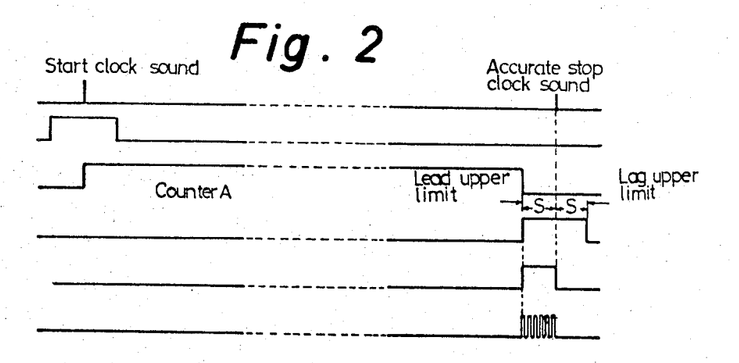
Figure 3:
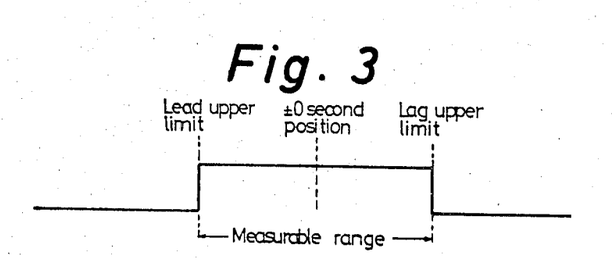

The graphs of FIGS. 1 to 3 illustrate the principles of conventional systems for measuring the time rate of a clock, and such conventional systems have a shortcoming in that they are highly complicated, as pointed out in the foregoing.

The system of the present invention will now be described by taking an example of measuring the daily deviation of a clock by determining the time interval over $N$ clock sounds of the clock, which clock is to accurately generate $F$ clock sounds per second.

Figure 4:
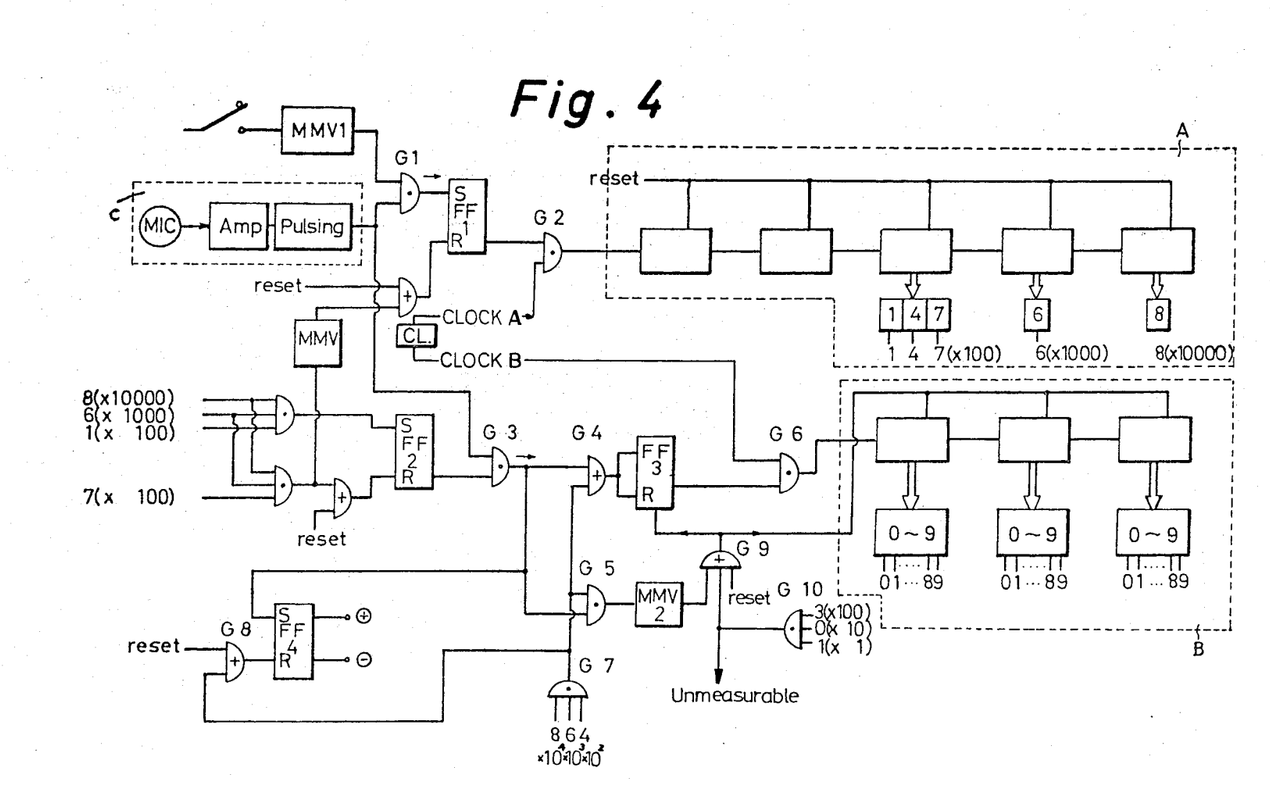
FIG. 4 is a block diagram of an embodiment of the present invention.

Referring to FIG. 4, upon depression of a start switch START, a monostable multivibrator MMV1 generates a pulse whose duration is a little longer than ($1/F$) second, and at least one clock sound passes through an AND gate $G_1$. This clock sound is referred to as "start clock sound." By the start clock sound, a flip-flop FF1 is reversed and an AND gate $G_2$ is opened for passing clock pulses to a counter A.

Figure 5:
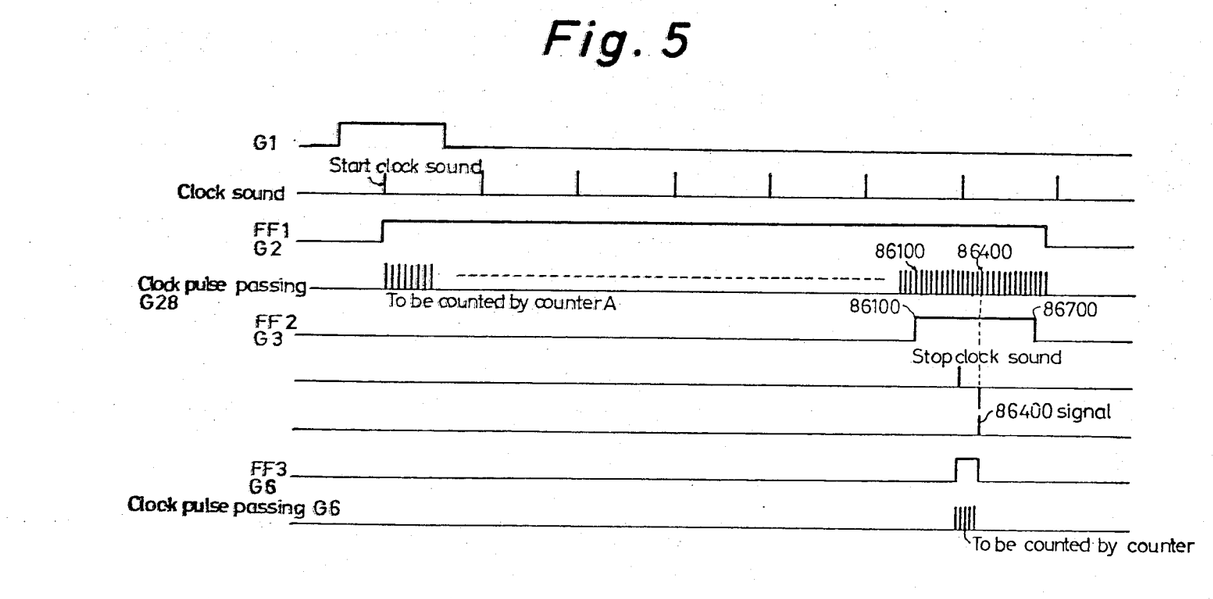
FIGS. 5 and 6 are time charts related to the embodiment of FIG. 4.

In view of the fact that there are 86,400 seconds in a day, the frequency of the clock pulses can, for instance, be determined so as to generate 86,400 pulses in the time interval for correct $N$ clock sounds of the clock. In order to facilitate the indication of the daily deviation in a range of ±300 seconds per day, the 86,100th, 86,400th, and 86,700th clock pulses can be delivered to the outside. A counter A is to count such clock pulses, which counter acts to set the flip-flop FF2 at the 86,100th clock pulse by delivering a pulse thereto, and the counter A acts to reset the flip-flop FF2 at the 86,700th clock pulse, as shown in the time chart of FIG. 5. As long as the daily deviation falls in the range of ±300 seconds, the ($N+1$)th clock sound must be generated between 86,100th clock pulse and the 86,700th clock pulse. If $N$ intervals between adjacent clock sounds are taken starting from the 1st clock sound acting as a start clock sound, the last or stop clock sound is the ($N+1$)th clock sound. A gate $G_3$ is controlled by the flip-flop FF2, which is set by the 86,100th clock pulse and reset by the 86,700 clock pulse, so that the stop clock sound passes through the gate $G_3$. If the stop clock sound reaches the gate $G_3$ prior to the 86,400th clock pulse, the clock is fast or leading, while if it comes after the 86,400th clock pulse, the clock is slow or lagging.

The operation of a flip-flop FF4 will now be described. The flip-flop FF4 is initially reset, and in the case of leading, it is set by the stop clock sound and reset by the 86,400th clock pulse. The 86,400th clock pulse is delivered to the flip-flop FF4 through an AND gate $G_7$ and an OR gate $G_8$. Thus, the flip-flop FF4 returns to its initial condition under the leading conditions. On the other hand, in the case of lagging, the 86,400th clock pulse enters first, but it acts in the resetting direction and does not actuate the flip-flop FF4, and the flip-flop FF4 is set by the stop clock sound. Thus, the flip-flop FF4 remains as set, under the lagging conditions. Accordingly, the leading or lagging conditions can be differentiated, depending on whether the flip-flop FF4 remains as set or reset. In the embodiment of FIG. 4, the plus (+) output of the flip-flop FF4 represents the lagging daily deviation, while the minus (−) output thereof represents the leading daily deviation.

Figure 6A:
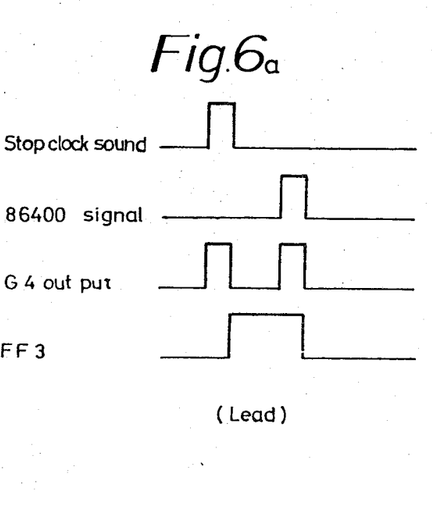
Figure 6B:
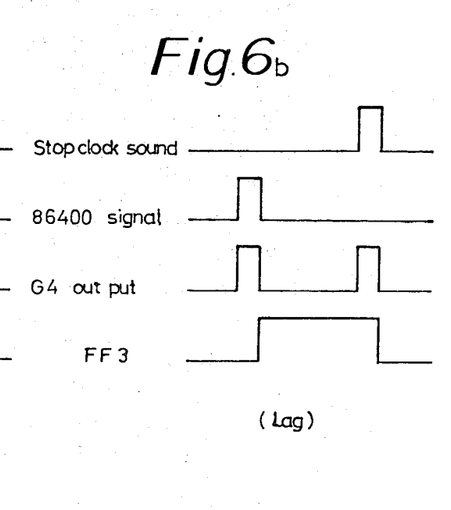
Figure 6C:
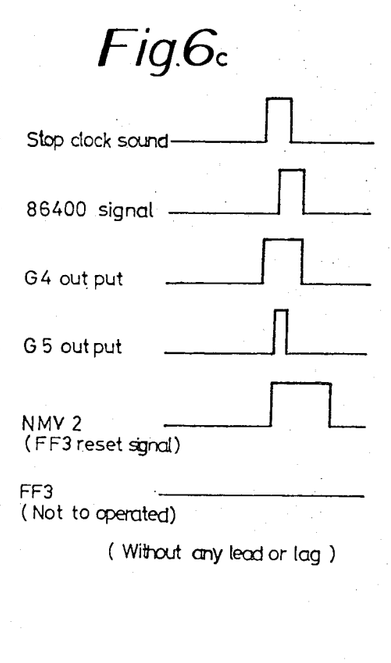

The operation of a flip-flop FF3 will now be described, by referring to the time charts of FIG. 6. As long as the stop clock sound and the 86,400th clock pulse are separately applied to an OR gate $G_4$, as shown in sections (a) and (b) of FIG. 6, the OR gate $G_4$ generates two distinct pulses, so that the symmetrically triggerable flip-flop FF3 is actuated in the sequence of reset-set-reset, so as to control an AND gate $G_6$ accordingly. Referring to the section (c) of FIG. 6, if the clock is substantially correct without any significant lead or lag, the stop clock sound and the 86,400th clock pulse are substantially simultaneously applied to the OR gate $G_4$, so that the OR gate $G_4$ produces only one output pulse for keeping the flip-flop FF3 as set. In this case, another AND gate $G_5$ produces an output for actuating a monostable multivibrator MMV2 so as to trigger the reset terminal of the flip-flop FF3. Thus, the flip-flop FF3 is reset under all conditions. The width of the output pulse from the monostable multivibrator MMV2 should preferably be somewhat longer than the stop clock sound and the 86,400th clock pulse.

Thus, as long as the stop clock sound and the 86,400th clock pulse are applied substantially at different moments, the flip-flop operates in the sequence of reset-set-reset, for controlling the AND gate $G_6$. Accordingly, the clock pulses through the gate $G_6$ are counted by a counter B, so as to represent the absolute value of the daily deviation by using the count at the counter B. If the stop clock sound and the 86,400th clock pulse coincide, the AND gate $G_6$ is not actuated, as shown in the section (c) of FIG. 6, so that the counter B is not operated, indicating that the daily deviation is zero.

In the foregoing explanation, especially in FIG. 4, it is assumed that the same clock pulses are applied to both the gate $G_2$ and the gate $G_6$. The invention, however, is not restricted to such arrangement, and the frequency of the clock pulse applied to the counter A may be different from that applied to the counter B. For instance, the frequency of the clock pulses to be applied to the counter A may be doubled, as compared with the frequency of the other clock pulses to be applied to the counter B. In this case, it is possible to obtain signal pulses representing the daily deviation of +300 seconds, ±0 second, and −300 seconds simply by decoding the pulses from the counter A at 177, 220th (86,100×2), 172,800th (86,400×2), and 173,400th (86,700×2), respectively. Since the pulses thus decoded represent the correct time, the frequency of the clock pulse to be applied to the counter A should be capable of indicating the correct time, and it is the only requirement for the frequency thereof. To this end, the frequency of the clock pulses to be applied to the counter A should not be lower than the frequency of the clock pulses assigned for the counter B and should be capable of covering the time interval of correct N clock sounds. As long as such conditions are satisfied, any frequency can be used for the clock pulses to be applied to the counter A.

The use of different frequencies for the pulses to the counter A and those to the counter B has the following merits. As pointed out above, the frequency of the clock pulses to the counter A can freely be selected as long as it is not lower than the frequency of the clock pulses to the counter B and it covers the time interval over N correct clock sounds. The frequency of the clock pulses to the counter B is determined by the requirement of indicating the daily deviation bases on the corresponding error in the time interval of N correct clock sounds (for instance, 86,400 pulses for the time interval of correct N clock sounds). Thus, the ratio of the required accuracy of the frequency of pulses for the counter A and that for the counter B becomes as follows. 86,400 (seconds per day)/300 (seconds in the measuring time interval)= 288

Thus, the frequency of the clock pulses to the counter B can tolerate an accuracy which is 1/288 of the accuracy of the frequency of the clock pulses for the counter A. More particularly, if a quartz oscillator is used to establish the pulse frequency for the counter A, which quartz oscillator is usually used in frequency counters and the like at 1 $MH_z$, 100 $KH_z$, 10 $KH_z$, etc. The quartz oscillator can ensure a high accuracy at a comparatively low cost. As compared with such quartz oscillator for the clock pulses for the counter A, the accuracy of the oscillator for the clock pulses for the counter B can be in the order of one hundredth of the former.

Thus, the overall accuracy of the device for digitally measuring the deviation of clocks and watches according to the present invention depends on the accuracy of the quartz oscillator for the clock pulses to the counter A, provided that accuracy of the other oscillator for the counter B is comparatively low. Furthermore, the extent to which the accuracy of the oscillator for the counter B can be reduced relative to that for the counter A depends on the working time of the counter A and the counter B, so that the accuracy ratio of the two oscillators can be increased or reduced, relative to the aforesaid value 288.

In FIG. 4, the means inclosed by the dotted lines C is to acoustically pick up the clock sound of a clock, and comprises a microphone, an amplifier, and a pulse generator.

Recently, the production of a clock driven by a sound piece or a tuning fork has greatly increased. The frequency of such tuning fork or sound piece spreads over a considerably wide range, such as 100 c/sec, 150 c/sec, 200 c/sec, 256 c/sec, 300 c/sec, 360 c/sec, 480 c/sec, and 720 c/sec. Accordingly, the frequency of the clock itself spreads widely; namely, quartz clocks at one oscillation per second, balance wheel clocks at several up to 20 oscillations per second, and tuning fork clocks at several tens to several hundreds oscillations per second. It is not necessarily easy to digitally measure the deviation of all such clocks having different oscillating frequencies. This invention mitigates such difficulty in the digital measurement of the time rate by taking the following approach.

Quartz wrist-watches usually have one or two clock sounds per second, so that it is advantageous to take measurement for a time period representing about 40 clock sounds. If such time interval is selected, the aforesaid measuring scheme can directly be applied to such quartz wrist-watches.

In the case of tuning fork or sound piece clocks, their oscillating frequency can be represented by a round number in the range of 100 to 1,000 c/sec, so that it is possible to generate a pulse series 1 to 0.5 c/sec by passing the clock sounds of such clocks through a frequency divider. Thereafter, the aforesaid approach for the quartz clocks can be used. It should be noted that a wide variety of oscillating frequency is used in the tuning fork or sound piece clocks, depending on who makes them, so that different kinds of frequency dividers or a frequency divider capable of modifying its dividing ratio must be prepared in order to apply the aforesaid approach to such tuning fork or sound piece clocks.

An embodiment of such an approach will now be described by referring to FIG. 7. The embodiment, as illustrated in the figure, is characterized in that output pulses of a certain constant frequency are generated for clock sounds of different frequencies by modifying the frequency dividing ratio of a frequency divider, The output from the frequency divider will be referred to as time reference signals or clock signals.

Figure 7:
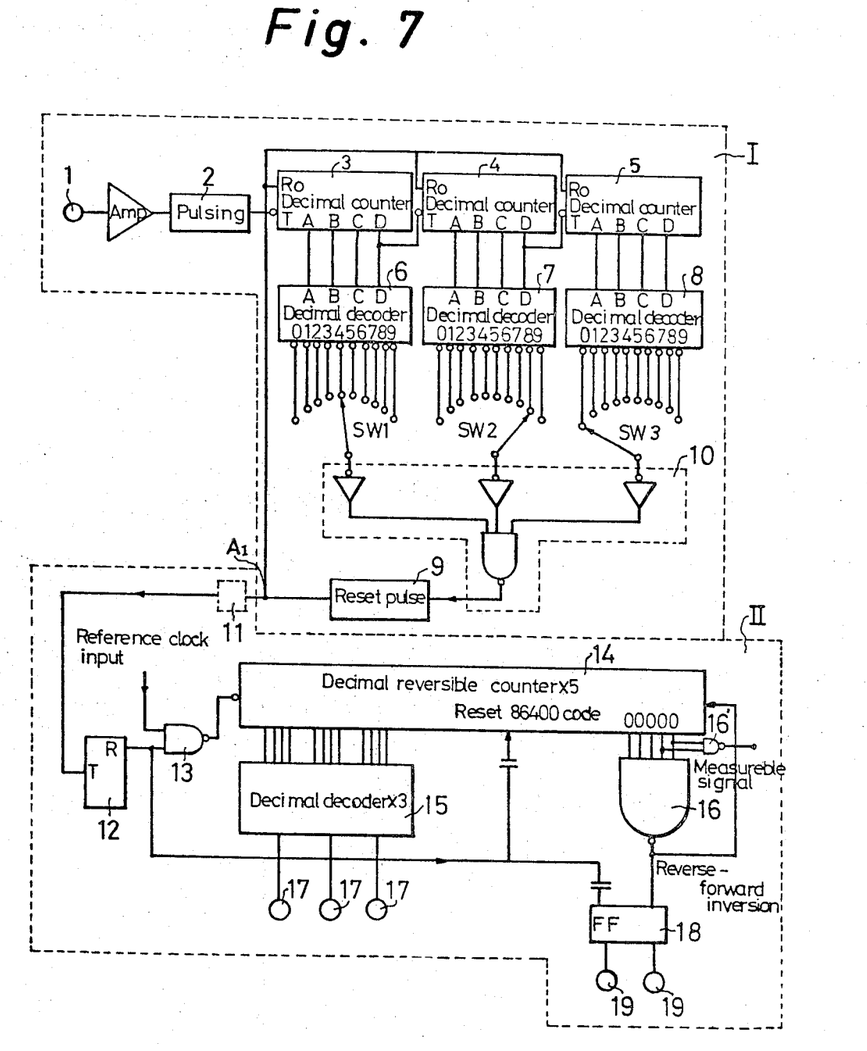
FIG. 7 is a schematic diagram of another embodiment of the present invention.

In FIG. 7, a frequency divider I comprises a pick-up 1 for detecting the oscillating frequency of clock sounds, which are amplified by an amplifier Amp and then pulsed by a pulsing means 2. Three decimal counters 3, 4 and 5 are provided in the frequency divider for counting the number of pulses from the pulsing means at the places of $10^0$, $10^1$, and $10^2$, respectively. Since a decimal number can be larger than $2^3$ but it is always smaller than $2^4$, four flip-flops are necessary in each decimal counter. In the frequency divider, the output from each of the decimal counters 3, 4, and 5 are applied to the corresponding one of decimal decoders 6, 7, and 8, respectively. Three switches SW1, SW2, and SW3 connected to the output terminals of the decimal decoders are set at the oscillating frequency of the clock being measured. When the output from the decimal decoders coincide with the set values at the switches SW1, SW2, and SW3, a reset pulse generator 9 is actuated through an AND circuit 10 (in the illustrated embodiment, the circuit 10 is a combination of AND circuits and a NAND circuit), so as to generate a reset pulse for self-resetting the counters 3, 4, and 5.

The reset pulse at the point A of the frequency divider I is applied to a deviation measuring unit II as its input signal. The frequency dividing ratio is made variable by modifying the setting of the switches connected to the output terminals of the decimal decoders. Thus, the reset pulse at the point A represents the outcome of the variable frequency division of the oscillating frequency of the clock being measured, which frequency division is effected by using the decimal counters of forced reset type.

It is preferable to generate a pulse train at a rate of one pulse per second. An additional frequency divider 11 may be disposed at the input of the deviation measuring means II, so as to meet special requirements for certain measuring time. The signal at the point A may be used as the above defined clock signal, so that such clock signals may be connected to the gates $G_1$ and $G_3$ of FIG. 4 by assuming that the frequency divider I of FIG. 7 corresponds to the pick-up circuit C of FIG. 4. In the embodiment of FIG. 7, however, a conventional reverse counter is used as the illustrated time rate measuring means II.

Referring to the figure, the clock signal is applied to a T flip-flop (T-FF) 12, which is connected to a NAND circuit 13, so that a decimal reversible counter assembly 14 is actuated by the output from the NAND circuit 13 based on the output from the T-FF 12 and a reference clock input (having a frequency of 86,400/N). Five decimal counters are connected in series in the assembly 14, of which three lower place counters are connected to digital indicators 17 through decimal decoders 15, respectively.

In order to digitally measure the time rate of a clock, the measuring means II of FIG. 7 determines the time interval of N clock signals, between a first or start clock signal and an Nth or stop clock signal, so as to indicate the deviation of such time interval thus measured from the corresponding correct time interval. With the reverse counter of the illustrated embodiment, its initial condition is set at 86,400, and the NAND gate 13 is actuated by the start clock signal for beginning the reverse counting by the reverse counter 14.

For a fast clock, the contents of the counter 14 is reduced as the counting proceeds, but the counting is ceased by the aforesaid stop clock signal, before the contents become zero. On the other hand, for a slow clock, the contents of the counter 14 is reduced from its initial value 86,400 until it becomes zero, when the mode of operation of the counter 14 is automatically switched from reverse to forward, so that as the succeeding clock pulses are delivered to the counter 14, the counter continues its forward counting until the aforesaid stop clock signal is applied to the gate 13.

The aforesaid automatic switching of the mode of operation is carried out by the NAND gate 16 of FIG. 7.

For a correct clock having neither lead nor lag, the counter 14 is stopped at the moment when its contents becomes zero and its mode of operation is switched to forward counting. Thus, the contents of the counter remains zero.

Thus, the judgement of the leading or lagging of a clock being measured depends on whether the counter 14 is stopped during its reverse counting mode or forward counting mode, or it depends on whether the contents of the counter 14 passed through zero or not. In the embodiment of FIG. 7, the condition of a flip-flop 18 is switched when the contents of the counter 14 passes zero, so as to indicate the leading or lagging of the clock by an indicating lamp 19 by symbols plus (+) and minus (−).

For a clock having an excessively large deviation, those counter elements in the assembly 14 which are not used in the aforesaid counting of the clock pulses are actuated, so as to remove a measurable signal from an AND gate 16'. Thereby, the power source circuit to the indicators 17 is interrupted for disabling the indication of the deviation at the indicators 17.

In the embodiment of FIG. 7, a reversible counter is used in the time rate measuring means II. It is, however, apparent to those skilled in the art that an excess-three code counter or the forward counting means of FIG. 4 can also be used in the timerate measuring means II in lieu of the reversible counter assembly 14. It is essential in the frequency divider I that a pulse train of a certain integer frequency is generated at the point A, and the frequency dividing ratio at the divider I should preferably be adjustable. Referring to FIG. 7, the pick-up 1 for finding the actual clock sounds of a clock being measured can be a magnetic pick-up, especially in the case of tuning fork clocks. Such magnetic pick-up is is often easier to handle and more accurate, as compared with acoustic pick-ups.

Referring to FIG. 4, the counters A and B can be made of integrated circuit (IC) decade counters available in market, and conventional decimal decoders may be used for decoding into decimal numbers. Thus, the entire time rate measuring system can easily be constructed by using IC elements, without relying on any special counters. Accordingly, the overall construction of the circuitry is very simple.

If the time rate of a clock falls outside of the aforesaid range of ±300 seconds per day, the aforesaid stop clock sound does not fall between the 86,100th and 86,700th clock pulses, and hence, the stop clock sound cannot pass through the gate $G_3$ of FIG. 4. As a result, the counter B continues its counting without stopping. A (−) 301 signal may be generated at the counter B, in response to such excessive counting, so as to indicate the occurrence of such excessive counting and to disable the flip-flop FF3. The circuit relating to such excessive counting is shown by an AND gate G10 and an OR gate G9 in FIG. 4. which gates are connected to the counter B and the flip-flop FF3, as shown in the figure. The signal (−) 301 may be applied to a suitable indicator (not shown) for indicating the fact that the time rate of the clock being measured exceeds the measurable range of the measuring system.

As described in the foregoing disclosure, according to the present invention, the time rate of a clock being measured can be indicated in terms of lead or lag per day, by comparing the time interval of N clock sounds of the clock, between a start clock sound and a stop clock sound, against a series of correct standard clock pulses, such as 86,400 pulses to be generated during the correct time interval corresponding to the aforesaid actual time interval of the clock being measured. More particularly, the sense of the deviation is determined by finding the timing of said stop clock sound relative to a predetermined reference signal selected from the standard pulses, such as the 86,400th standard pulse. With the system according to the present invention, it is also possible to indicate the aboslute value of the daily deviation, by counting the number of the standard pulses between said reference pulse and said stop clock sound from the clock being measured, while using suitable gate control circuitry.

When the absolute value of the daily deviation is determined in the aforesaid manner, a system may be devised for automatically adjusting the hand of a fast or slow clock. In any case, with the time rate measuring system according to the present invention, personal errors involved in the determination of the daily deviation of clocks is completely eliminated. Thus, the invention contributes greatly to the industry.

Although the present invention has been described with a certain degree of particularity, it is understood that the present disclosure has been made only by way of example and that numerous changes in the details of construction and combination and arrangement of parts may be resorted to without departing from the spirit and the scope of the invention as hereinafter claimed.

What is claimed is:

1. A digital time rate measuring system for a timing device comprising:
    means for receiving timing signals from the timing device wherein one timing signal is defined as a start timing signal and a subsequent timing signal is defined as a stop timing signal;
    reference clock pulse means;
    first gating means for defining a first interval of reference clock pulses equispaced on either side of a median reference pulse and timed to include said stop timing signal;
    means responsive to the time sequence of occurrence of said median reference pulse and said stop timing signal during said first interval;
    second gating means for defining a second interval within said first interval between the times of occurrence of said reference pulse and said stop timing signal;
    deviation clock pulse means for providing a deviation time rate, and
    counting means connected to said deviation clock pulse means for counting the absolute number of deviation clock pulses occurring during said second interval.

2. A system as in claim 1 wherein said reference clock pulse means is of a greater accuracy and higher frequency than said deviation clock pulse means.

3. A system as in claim 1 wherein said reference clock pulse means and said deviation clock pulse means are supplied from the same clock source.

4. A system as in claim 1 wherein said first gating means further includes counting means for counting the number of reference clock pulses, decode means for detecting the median reference pulse and the pulses at the lower end and upper end of said first interval and circuit means turned on by the lower end pulse and turned off by the upper end pulse.

5. A system as in claim 1 wherein said means responsive to the time sequence includes circuit means having two stable states wherein said circuit means is placed in a first state when said reference pulse precedes said stop timing signal indicating a lag condition and said circuit means is placed in a second state when said stop timing signal precedes said reference pulse indicating a lead condition.

6. A system as in claim 1 wherein said second gating means includes circuit means which can be turned on and subsequently turned off by both said reference pulse and said stop timing signal.

7. A system as in claim 1 and further including decode means coupled to said counting means for detecting a predetermined number of deviation clock pulses and in response thereto terminating the operation of said second gating means.

8. A system as in claim 4 wherein said means for receiving further includes pick-up means coupled to the timing device, amplifying means receiving the output from said pick-up means, and pulsing means connected to the output of said amplifier.

9. A system as in claim 1 wherein said means for receiving includes frequency dividing means.

10. A system as in claim 9 wherein said frequency dividing means further includes,
    a plurality of decimal counter for counting the timing signals;
    a plurality of decimal decoders connected to corresponding ones of said decimal counters and each including switch means for selecting the number to be decoded;
    output means for producing an output pulse when all said decoders have decoded the selected numbers; and
    reset means responsive to said output pulse for resetting said decimal counters.

* * * * *